United States Patent
Brukovsky et al.

[15] 3,690,798
[45] Sept. 12, 1972

[54] EXTRUDER HEAD

[72] Inventor: Anthony Raspante, Centerville, Mass.

[73] Assignee: Packaging Industries, Inc., Hyannis, Mass.

[22] Filed: Oct. 24, 1969

[21] Appl. No.: 869,142

Related U.S. Application Data

[63] Continuation of Ser. No. 841,816, July 15, 1969.

[52] U.S. Cl.......425/167, 264/167, 264/209, 425/381
[51] Int. Cl....................................B29d 23/04
[58] Field of Search....18/14 V, 14 R, 14 A, 14 C, 14 G, 14 H, 14 P, 14 RR, 14 S, 14 T; 264/167, 209

[56] References Cited

UNITED STATES PATENTS

| | | |
|---|---|---|
| 2,780,835 | 2/1957 | Sherman....................18/14 V |
| 3,386,132 | 6/1968 | Fischer......................18/14 V |
| 3,535,739 | 10/1970 | Mehnert....................18/14 V |
| 2,241,543 | 5/1941 | Deitz..........................72/263 |

*Primary Examiner*—J. Spencer Overholser
*Assistant Examiner*—Lucius R. Frye
*Attorney*—Kenyon & Kenyon

[57] ABSTRACT

A variable orifice extruder head for extruding parisons whose wall thickness may be varied over the length of the parison. The extruder head comprises a die assembly movable with respect to a fixed mandrel for varying the die assembly orifice. The die assembly is supported by suspension rods from a fixed housing through which the mandrel passes and in relation to which the mandrel is also fixed. The suspension rods are threaded at their upper ends and have spur gears threaded thereon. An internal ring gear engages each of the spur gears in such manner that rotation of the ring gear causes rotation of the spur gears thereby to raise or lower the die assembly.

17 Claims, 9 Drawing Figures

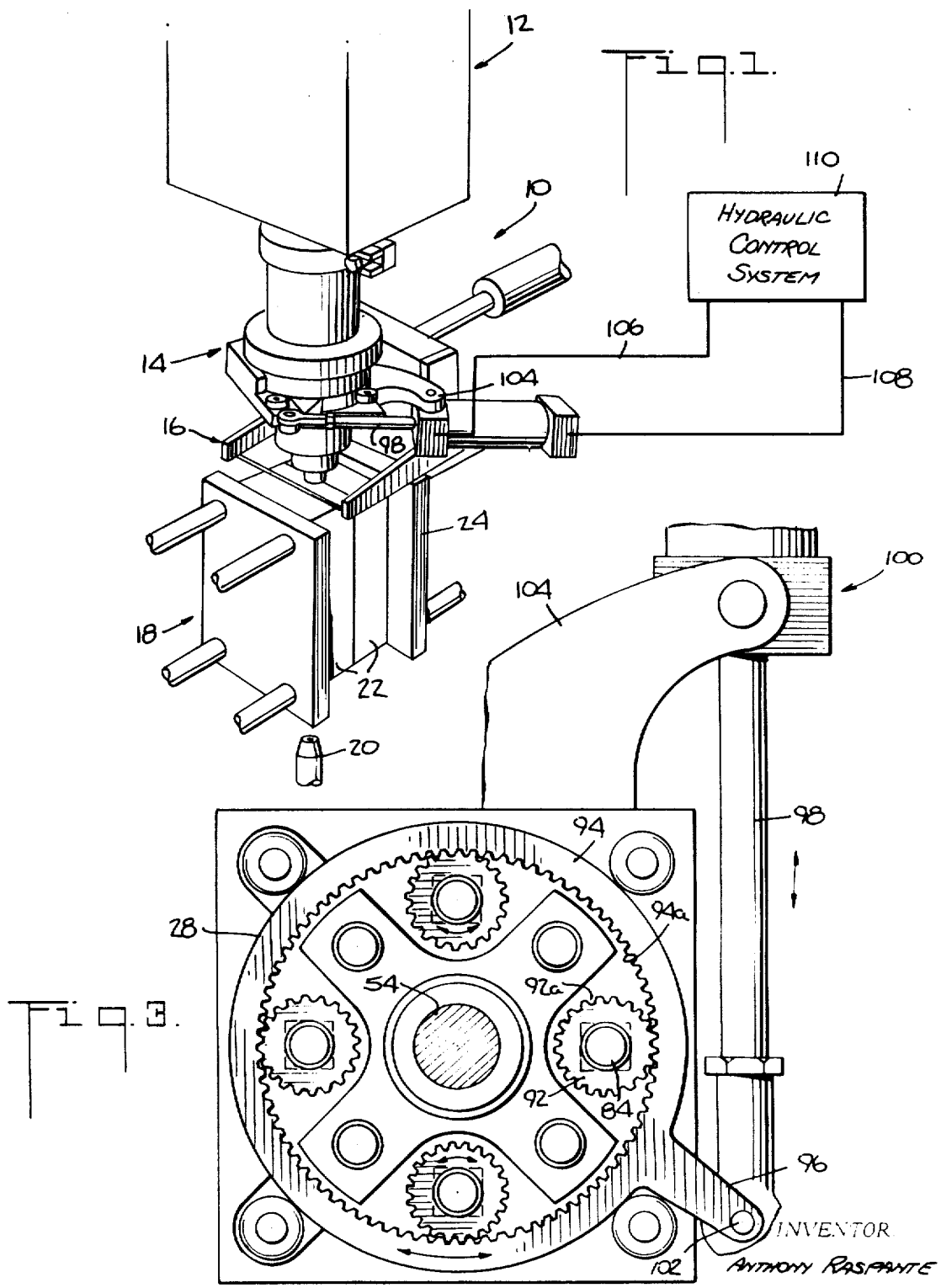

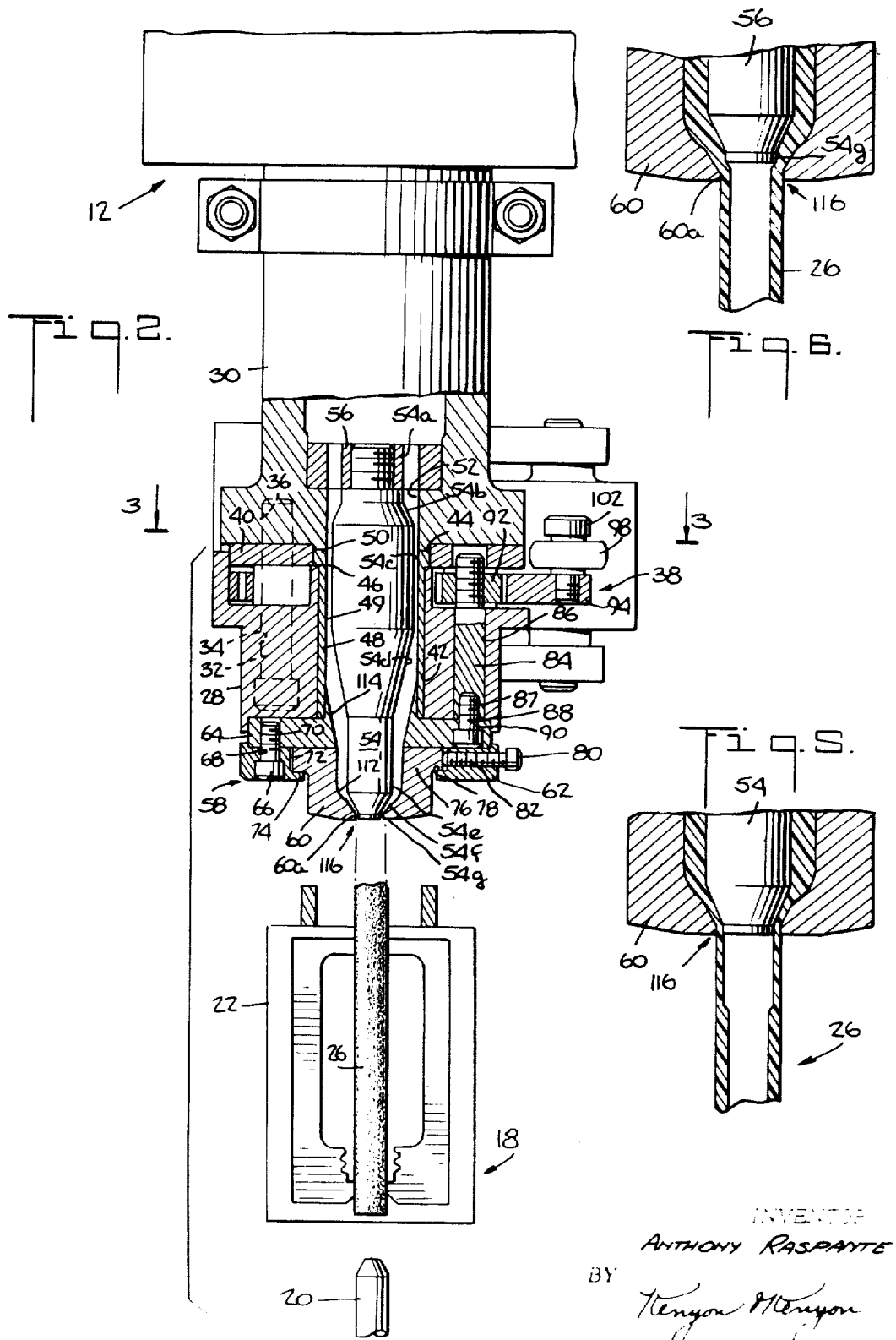

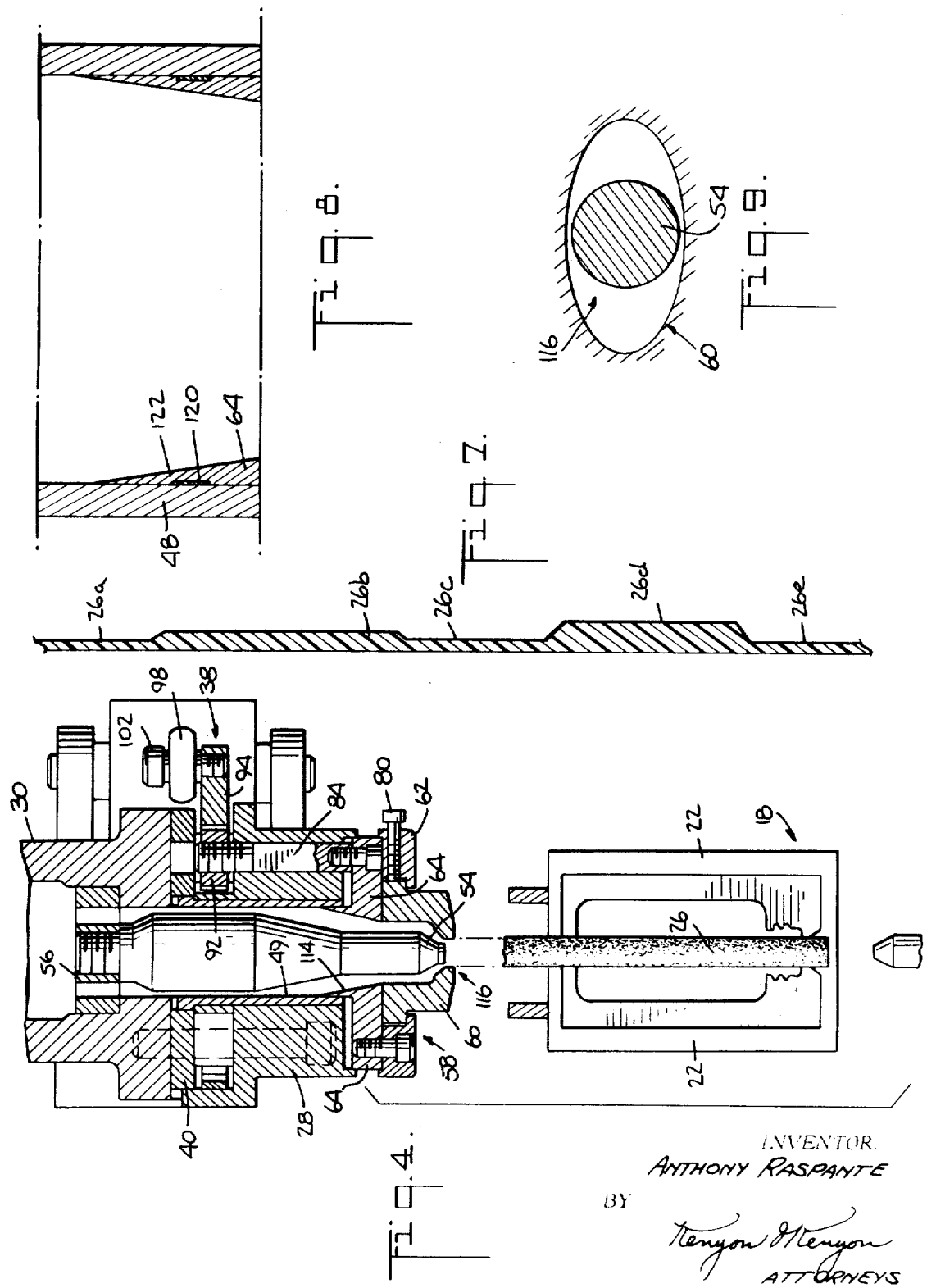

3,690,798

EXTRUDER HEAD

FIELD OF THE INVENTION

This invention relates to extruder heads for producing parisons of varying wall thickness and to a new method for controlling any extruder head for producing parisons of varying wall thickness.

BACKGROUND OF THE INVENTION

It is often desirable to vary the wall thickness of parisons used in blow molding, either to improve the uniformity of thickness of the finished article or to produce finished articles having walls which vary in thickness over the length of the article. Where accumulator ram or reciprocating screw type blow molders have been used, parison wall thickness has been controlled by producing a desired sequence of extrusion rates during a single shot. However, this method is quite complicated and requires the use of special extruders which are disposed horizontally. It would be desirable if standard extruders could be used to obtain variable thickness parisons since greater efficiency and economy would result. It would also be desirable to use vertically disposed extruders to conserve plant space required for the extruders.

It has been proposed to use a variable orifice extruder head wherein the mandrel is varied in order to produce a parison having a varying wall thickness. Although this technique has the advantage of being able to be used with standard extruders, it has not been found to be suitable for use with vertically disposed extruders or with all types of thermoplastic resins. Thus, where the movable mandrel extruder head has been used with polyvinylchloride (PVC) resin, storing of the resin in the head has caused charring, thereby causing interference with movement of the mandrel and contamination of the parison being extruded.

It would also be desirable if the thickness of the parison wall could be controlled in small increments over a given range of thicknesses and if wall thickness of a parison could be changed rapidly but accurately.

It is thus an object of the present invention to provide an extruder head which is capable of producing parisons which have varying wall thicknesses.

It is also an object of the present invention to provide a variable orifice extruder head which may be used with standard extruders. It is a further object of the present invention to provide a variable orifice extruder head which permits use of vertically disposed extruders.

It is yet another object of the present invention to provide an extruder head having a variable die orifice which may be varied in small increments over a desired range of parison wall thicknesses and which may be varied rapidly and accurately.

It is still another object of the present invention to provide an extruder head which is capable of producing eliptically shaped parisons.

It is yet still another object of the present invention to provide a method of producing parisons having varying wall thicknesses.

SUMMARY OF THE INVENTION

Other and further objects and advantages well known to those skilled in the art are provided by means of the variable orifice extruder head of the present invention. Generally, an extruder head is provided having a fixed mandrel positioned within a movable die assembly, the ends of the die assembly and the mandrel defining an orifice whose configuration may be varied by movement of the die assembly with respect to the mandrel. The die assembly is movably mounted from a fixed die assembly head housing by means of suspension rods externally threaded at one end thereof and having spur gears threaded onto the ends. An internal ring gear is also mounted on the die assembly head housing and is in meshing engagement with the spur gears in such manner that rotation of the ring gear causes rotation of the spur gears and consequent raising and lowering of the movable die by means of the suspension rods being raised and lowered.

According to one aspect of the invention an actuater is connected to the ring gear to cause rotation thereof. The actuator may be electrically, hydraulically or pneumatically actuated. According to another aspect of the invention the extruder orifice is generally eliptically shaped to produce eliptically shaped parisons.

According to the method of the present invention a parison having a wall thickness which is varied over the length thereof is formed by feeding extrudable material in a pliable state around the fixed mandrel of an extruder head and varying the orifice of the extruder head to thereby vary the thickness of the parison wall through movement of a die movable relative to the fixed mandrel.

DESCRIPTION OF THE DRAWINGS

FIG. 1 is a perspective view of a blow molding apparatus using a preferred embodiment of the extruder head of the present invention.

FIG. 2 is a partially sectional elevational view of the apparatus of FIG. 1 showing the movable die assembly in position to extrude a parison having a thin wall.

FIG. 3 is a sectional plan view taken along line 3—3 of FIG. 2.

FIG. 4 is a partially sectional elevational view similar to FIG. 2 showing the movable die in position to extrude a parison having a thicker wall than the parison extruded in FIG. 2.

FIGS. 5 and 6 are sectional elevational views showing various positions of the die assembly relative to the mandrel for extruding parisons having walls of different thicknesses.

FIG. 7 is a cross sectional view of a parison having a wall whose thickness varies over the length thereof.

FIG. 8 is a detail of the joint between the movable die and fixed liner of the apparatus of FIG. 1.

FIG. 9 is a partially sectional plan view of an orifice configuration which may be used with the head of FIG. 1.

DESCRIPTION OF THE INVENTION

Referring now to FIGS. 1–3 there is shown an extruder head according to the present invention as used in blow molding apparatus. Blow molding apparatus 10 comprises vertically disposed extruder 12, extruder head 14, parison cutting blade 16, blow mold 18 and blow tube 20. Extruder 12 may be any standard type extruder such as a vertically disposed screw type extruder. It will be understood that any extruder well known to those skilled in the art may be used in conjunction with the extruder head of the present invention. As explained hereinabove advantages of the extruder head of the present invention are that a standard extruder may be used therewith without modification thereof to produce parisons with walls of varying thickness and that the extruder may be disposed vertically.

Extruder head 14 (to be described in greater detail hereinafter) produces a parison or tube like extrusion from the orifice thereof. The extruded parison is fed between mold dies 22 of blow mold 18. Mold dies 22 have an internal configuration complementary to the external configuration of a hollow article to be formed therein. Dies 22 are mounted for relative movement toward and away from each other on rams 24 which may for example be hydraulically actuated.

When mold dies 22 have been closed, a parison 26 will be trapped therebetween and blade 16 will be moved transverse to the parison to sever it from the parison length being formed by head 14.

Blow tube 20 will thereafter be inserted into the lower end of parison 26 and air under pressure introduced to expand the parison into the mold cavity of blow mold 18 to form the desired hollow article. After the article has been cured, mold dies 22 are opened to eject the article therefrom and to receive a new parison for formation of another hollow article.

A preferred embodiment of extruder head will now be described. As shown, extruder head 14 comprises a die assembly head housing 28 secured to extruder head mounting block 30 of extruder 12 by means of suitable fasteners such as screws 32 passing through bores 34 in housing 28 threaded into tapped holes 36 in block 30.

Housing 28 supports at its upper end a programmer assembly 38 to be hereinafter described in greater detail and cover die housing 40. Housing 28 and housing 40 are respectively provided with vertically extending bores 42 and 44, bore 44 having a greater diameter than 42 to provide a shoulder 46 on housing 28.

A cylindrical bushing 48 having a bore 49 interfits in bores 42 and 44 and has a circular rim 50 at the top thereof which is adapted to engage shoulder 46 to thereby hold bushing 48 within head 14.

A bore 52 in block 30 has a diameter equal to the inner diameter of bore 49 of bushing 48 and the inner surface of bore 52 forms a continuous surface with the inner surface of bore 49.

Positioned within and of lesser diameter than bores 49 and 52 is a fixed mandrel 54 secured at its upper end to block 30 by retaining element 56 into which said upper end is threaded. Mandrel 54 has a cross sectional area which varies over the length thereof. As shown, the area is constant along the top segment 54a, gradually increases along segment 54b, is constant along segment 54c, gradually decreases along segment 54d, is constant along segment 54e, decreases again along segment 54f and in constant along from segment 54g. The purpose for this variation in cross sectional shape of mandrel 54 will be described in greater detail hereinafter.

A movable die assembly 58 comprises die adapter 60, die adapter collar 62 and die adapter support 64. Collar 62 is secured to support 64 by means of fasteners such as screws 66 passing through bores 68 in collar 62 and screwed into tapped holes 70 in support 64.

Collar 62 is provided with a stepped inner bore 72 provided with annular shoulder 74. Adapter 60 has an enlarged upper portion 76 adapted to generally interfit with bore 72 of collar 62 and having an annular surface 78 adapted to engage and be supported by shoulder 74.

Screws 80 threaded through horizontally extending bores 82 in collar 62 are provided to permit positioning of adapter 60 relative to support 64 for alignment of bore 112 of adapter 60 with bore 114 of support 64.

Die assembly 58 is movably supported from housing 28 by means of suspension rods 84 passing through bores 86 in housing 28. Rods 84 have tapped holes 87 at their lower ends to receive screws 88 passing through bores 90 in support 64. The lower ends of rods 84 have a square cross-sectional shape and bores 86 are also square in cross-sectional shape to receive the lower ends of rods 84 and to thereby prevent rotation thereof. Rods 84 are externally threaded at their upper ends to receive internally tapped spur gears 92 threaded thereon. Spur gears 92 mesh with internal ring gear 94. As shown in FIG. 3, four rods 84 are provided and each is provided with a spur gear 92 which meshes with internal ring gear 94.

Ring gear 94 is provided with arm 96 which is pivotally secured to rod 98 of hydraulic cylinder 100 by means of pivot pin 102. Cylinder 100 is mounted on head 14 by means of mounting brackets 104. Cylinder 100 is preferably of the double acting type wherein fluid under pressure may be fed into either side of a piston (not shown) to which rod 98 is affixed in order to provide reciprocatory movement of rod 98 in either of two opposite directions.

As shown in FIG. 1, suitable hydraulic fluid is fed into either side of hydraulic cylinder 100 over fluid lines 106 and 108. The flow of fluid through lines 106 and 108 to cylinder 100 is controlled by a suitable hydraulic control system generally indicated by box 110. This control system may consist of appropriate control elements such as valves, a source of hydraulic fluid, a hydraulic pump and the like as is well known to those skilled in the art.

In general, system 110 will be designed to provide the necessary sequence of movements of rod 98 to thereby control the wall thickness of parison to be extruded by head 14.

It will be understood that other actuator means may be used to cause rotation of ring gear 94. For example, a suitable double acting pneumatic cylinder controlled by means of a suitable pneumatic control system might be provided to actuate gear 94. In addition, gear 94 may be electrically actuated and controlled by suitable motors, relays, switches and the like.

Die adapter 60 and die adapter support 64 respectively have contiguous inner bores 112 and 114 which are of such a configuration that they define with segments 54d, 54e, 54f and 54g of mandrel 54 an orifice region which may be varied by movement of die assembly 58 relative to mandrel 54. Thus, in the position of die 58 as shown in FIG. 2 the segment 54g of mandrel 54 defines with the bore segment 60a of adapter 60 an annular orifice 116 having a distance between mandrel 54 and adapter 60 which is relatively small.

This is because die assembly 58 is in the uppermost raised position and resin material which is extruded through orifice 116 will produce a parison having a wall whose thickness is relatively small. This is shown in FIG. 5 wherein a thin wall segment is shown as being extruded through orifice 116.

Referring to FIGS. 4 and 6, die assembly 58 is shown lowered to increase the distance between mandrel 54 and adapter 60 thereby to increase the thickness of annular orifice 116. In such a position, a parison having a thicker wall is extruded.

In operation, hydraulic cylinder 100 is actuated by control system 110 to cause rod 98 to either extend or retract. Movement of rod 98 causes rotation of internal ring gear 94 about the center of mandrel 54 as its center of rotation. Gear teeth 94a of gear 94 mesh with gear teeth 92a of spur gears 92 to cause spur gears 92 to rotate. Since gears 92 are internally threaded, they engage the threads on the upper ends of suspension rods 84.

Although there is a tendency of this interaction between gears 92 and rods 84 to rotate rods 84, this rotational tendency is suppressed by the fit of square ends of rods 84 in square bores 86 of housing 28 and the interraction is thereby converted into linear vertical movement of rods 84 and consequently of die assembly 58.

As shown in FIG. 3, when rod 98 is retracted, i.e., moved in an upward direction, gear 94 will be rotated in a counterclockwise direction, which in turn will cause gears 92 to also rotate in a counterclockwise direction. Rods 84 will be raised or lowered depending upon the direction of threading of rod 84 relative to gear 92. Similarly, extension of rod 98 in a downward direction will cause gears 94 and 92 to rotate in a clockwise direction thus causing rods 84 and die 58 to move in an opposite direction.

By programming the sequence of direction of travel and distance of travel of rod 98 of cylinder 100 in conjunction with the rate of extrusion of parison from head 14, any desired configuration of wall thickness of the parison over its length may be achieved. Thus, as shown in FIG. 7, a length of parison 26 has a wall thickness which is relatively thin along segment 26a; thicker along segment 26b; thinner along segment 26c; thickest along segment 26d and thinner again along segment 26e.

Referring now to FIG. 8 there is shown means for preventing clogging of head 14 when die assembly 58 is moved relative to bushing 48 and polyvinylchloride resin is extruded by head 14. This means comprises annulus 120 in the outer surface of segment 122 of the adapter support 64 of die 58. As support 64 is moved relative to bushing 48, there is a tendency of resin seeping between the surfaces thereof. Ordinarily this resin would work its way out into the space between housing 28 and support 64, become charred and cake on die assembly 58.

However, annulus 120 will act to trap the initial resin seepage which will then char and act as a charcoal seal to prevent further seepage of polyvinylchloride resin.

Referring now to FIG. 9 there is shown a preferred configuration of orifice 116 for producing an eliptically shaped parison. As shown, the tip of mandrel 54 is circular in cross-sectional shape whereas the end of the bore of adapter 60 is eliptical in cross sectional shape. The resulting orifice 116 has a shape substantially similar to the white region of the human eye. The parison produced through this orifice will have relatively thick side walls and relatively thin upper and lower walls with the region of thinness greatest along the minor axis thereof and the region of thickness the greatest along the major axis thereof.

It has been found that where polyvinylchloride resin is extruded from a horizontally disposed extruder head, the resin has tended to char in the ninety degree bend conduit feeding the resin from extruder to extruder head. In order to obviate the charring of the PVC resin, it is desirable to mount the extruder vertically. By using the extruder head of the present invention, this extruder may be mounted vertically to produce parisons having walls whose thickness varies over the length thereof. What is claimed is:

1. Apparatus for extruding resin material of wall thickness varying in a predetermined manner comprising structure forming a chamber for connecting said apparatus to a source of flow a resin material, a die having a centrally disposed bore extending therethrough and connected to the interior of said chamber, a mandrel extending through said chamber and having a portion extending within the bore of said die, and means for moving said die axially with respect to the length of said mandrel so as to change the size of the opening formed between said mandrel and said die thereby changing the wall thickness of the resin material extruded therethrough, said chamber having a centrally disposed bore extending therethrough, and in which said means for moving said die axially with respect to the length of said mandrel comprises means for movably mounting said die below said chamber with said bores of said chamber and said die substantially in alignment with one another, said mandrel having a portion extending through said bore of said chamber, said structure forming said chamber being provided with a plurality of bores extending therethrough, wherein said die mounting means comprises a plurality of suspension rods and means for securing said die to said rods, and wherein said rods extend through said plurality of bores in said structure.

2. The apparatus of claim 1 including means for mounting said mandrel in a fixed position relative to said chamber.

3. The apparatus of claim 1 wherein the lower ends of said plurality of suspension rods have a predetermined cross-sectional form and wherein said plurality of bores in said structure forming said chamber form another cross-sectional form adapted to provide a locking engagement with the lower ends of said suspension rods to prevent relative motion therebetween.

4. The apparatus of claim 1 further comprising said die mounting means for causing said die mounting means to raise and lower said die.

5. The apparatus of claim 1 wherein said die moving means further comprises a plurality of gears each having a central internally threaded portion, said gears being threadedly engaged to said upper ends of said rods, and an internal gear surrounding said plurality of gears and in engagement therewith, whereby rotation of said internal gear causes rotation of said plurality of gears and consequent vertical movement of said suspension rods and said die supported thereby with respect to said mandrel.

6. The apparatus of claim 5 including actuating means for selectively rotating said internal gear.

7. The apparatus of claim 6 wherein said actuating means comprises hydraulic actuating means.

8. The apparatus of claim 5 wherein said hydraulic actuating means includes a reciprocatable rod pivotally connected to said internal gear, whereby actuation of said rod in one direction causes said internal gear to rotate clockwise and actuation of said rod in an opposite direction causes said internal gear to rotate in a counterclockwise direction.

9. The apparatus of claim 6 including programmer control means for controlling said actuating means according to a predetermined sequence of operations.

10. An extruder head having a variable orifice for extruding a parison whose wall thickness may be varied comprising a die housing having a centrally disposed bore extending therethrough, a die, means movably mounting said die below said die housing, said die having a centrally disposed bore generally contiguous with said bore of said housing and defining therewith an extrusion chamber, a mandrel mounted relative to said housing and having a portion extending through said centrally disposed extrusion bores of said housing and said die, the end of said mandrel and the end of said bore of said die defining an extrusion orifice, and means for moving said die axially relative to said mandrel for avrying the dimensions of said orifice in order to change the wall thickness of the parison being extruded therethrough, said die housing being provided with a plurality of bores extending therethrough and wherein said die mounting means comprises a plurality of suspension rods secured at one end thereof to said die and wherein said rods extend through said plurality of bores in said die housing.

11. The extruder head of claim 10 wherein said upper ends of said rods extend above said die housing and are threaded and wherein said die moving means includes said suspension rods and further comprises internally threaded gears, said gears threadedly engaging said upper ends of said rods, and an internal gear surrounding said gears and engaging the teeth of said spur gears, whereby rotation of said internal gear causes rotation of said gears and consequent vertical movement of said suspension rods and said die supported thereby.

12. The extruder head of claim 11 including hydraulic actuating means for rotating said internal ring gear.

13. The extruder head of claim 12 including programmer control means for controlling the actuating motion of said hydraulic actuating means according to a predetermined sequence of operations.

14. The extruder head of claim 10 wherein said die includes an upwardly extending cylindrical portion, and wherein said die housing is provided with a lower inner cylindrical wall defining the lower portion of said centrally disposed bore extending through said housing, said upwardly extending portion of said die fitting within said lower inner wall portion of said die housing, the periphery of said upwardly extending portion of said die being provided with an annular groove, and material disposed in said groove and forming a seal between said upwardly extending portion and said lower inner wall portion.

15. The extruder head of claim 14 in which said material disposed in said groove and forming a seal comprises resin material which has passed from said centrally disposed bore into said groove during operation of said extruder head.

16. The extruder head of claim 10 wherein the cross-section of the end portion of said mandrel and the cross-section of said bore of said die surrounding the end portion of said mandrel are unsymetrical with respect to one another to provide an orifice of irregular form, whereby the wall thickness of the parison has corresponding irregularities.

17. The extruder head of claim 10 wherein the end of said mandrel is circular in cross-section and wherein the end of said bore of said die surrounds the end of said mandrel and is eliptical in cross-section, thereby defining the extrusion orifice for extruding parisons whose wall thickness varies as the clearance between the mandrel and bore varies.

* * * * *